US012795635B2

(12) United States Patent
Kucera et al.

(10) Patent No.: US 12,795,635 B2
(45) Date of Patent: Nov. 10, 2026

(54) BEAM MANAGEMENT ASSISTANCE

(71) Applicant: Nokia Technologies Oy, Espoo (FI)

(72) Inventors: Stepan Kucera, Munich (DE); Nuno Manuel Kiilerich Pratas, Aalborg (DK); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/794,593

(22) Filed: Aug. 5, 2024

(65) Prior Publication Data

US 2025/0056520 A1 Feb. 13, 2025

(30) Foreign Application Priority Data

Aug. 9, 2023 (GB) ...................................... 2312175

(51) Int. Cl.

*H04W 72/40* (2023.01)
*H04W 72/044* (2023.01)
*H04W 72/50* (2023.01)

(52) U.S. Cl.

CPC ......... *H04W 72/046* (2013.01); *H04W 72/40* (2023.01); *H04W 72/50* (2023.01)

(58) Field of Classification Search

CPC .............. H04B 7/0695; H04B 7/06952; H04B 7/06954; H04B 7/0696; H04B 7/088; H04W 72/046; H04W 72/40; H04W 72/50

USPC .......................................... 370/216, 329, 331

See application file for complete search history.

(56) References Cited

U.S. PATENT DOCUMENTS

2024/0340066 A1* 10/2024 Li .......................... H04W 72/40
2024/0349307 A1* 10/2024 Li .......................... H04W 72/25
2024/0422806 A1* 12/2024 Wu ......................... H04W 72/40

* cited by examiner

*Primary Examiner* — Harun Chowdhury

(74) *Attorney, Agent, or Firm* — Barta Jones, PLLC

(57) ABSTRACT

Embodiments of the present disclosure relate to apparatuses, methods, and computer readable storage media for beam management assistance. A first apparatus receives, from a third apparatus, assistance data for beam alignment with a second apparatus based on measurements from a fourth apparatus, the first apparatus to be communicated with the second apparatus. The first apparatus determines, based on the assistance data and the measurements from the fourth apparatus, a target beam from a plurality of candidate beams of the first apparatus. The first apparatus performs beam management and/or communications with the second apparatus by using the target beam.

20 Claims, 7 Drawing Sheets

BEAM MANAGEMENT ASSISTANCE

FIELDS

Various example embodiments of the present disclosure generally relate to the field of telecommunication and in particular, to methods, devices, apparatuses and computer readable storage medium for beam management assistance in sidelink (SL).

BACKGROUND

SL beam management involves initial beam-pairing among SL UEs, beam maintenance, beam failure recovery and so on, which may be implemented by reusing SL channel state information (CSI) framework and/or reusing Uu beam management concepts.

In SL frequency range 2 (FR2) communications, narrow-width high-gain beams are used to compensate for significant path loss in the mm-wave range. This however implies an increased risk of FR2 SL beam failure that may occur any time during the lifetime of a beam pair (i.e., during the initial beam pairing, maintenance, and recovery) due to diverse factors, such as, sleep modes, transmission inactivity, mobility, adverse radio propagation. Beam failure recovery procedure in SL FR2 may be triggered as a result of beam failure detection. To reestablish the communications over the narrow-width high-gain beams, the beam failure recovery procedure depends on mutual coordination between the two SL UEs involved.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a third apparatus, assistance data for beam alignment with a second apparatus based on measurements from a fourth apparatus, the first apparatus to be communicated with the second apparatus; determine, based on the assistance data and the measurements from the fourth apparatus, a target beam from a plurality of candidate beams of the first apparatus; and perform beam management and/or communications with the second apparatus by using the target beam.

In a second aspect of the present disclosure, there is provided a third apparatus. The third apparatus comprises at least one processor; and at least one memory storing instructions that, when executed by the at least one processor, cause the third apparatus at least to: obtain beam capability information of a first apparatus and a second apparatus; determine, based at least on the beam capability information, a fourth apparatus as a reference point for a communication between the first apparatus and the second apparatus; and transmit, to the first apparatus and the second apparatus, assistance data for beam alignment between the first apparatus and the second apparatus based on measurements from the fourth apparatus.

In a third aspect of the present disclosure, there is provided a method. The method comprises: receiving, at a first apparatus and from a third apparatus, assistance data for beam alignment with a second apparatus based on measurements from a fourth apparatus, the first apparatus to be communicated with the second apparatus; determining, based on the assistance data and the measurements from the fourth apparatus, a target beam from a plurality of candidate beams of the first apparatus; and performing beam management and/or communications with the second apparatus by using the target beam.

In a fourth aspect of the present disclosure, there is provided a method. The method comprises: obtaining, at a third apparatus, beam capability information of a first apparatus and a second apparatus; determining, based at least on the beam capability information, a fourth apparatus as a reference point for a communication between the first apparatus and the second apparatus; and transmitting, to the first apparatus and the second apparatus, assistance data for beam alignment between the first apparatus and the second apparatus based on measurements from the fourth apparatus.

In a fifth aspect of the present disclosure, there is provided a first apparatus. The first apparatus comprises means for receiving, from a third apparatus, assistance data for beam alignment with a second apparatus based on measurements from a fourth apparatus, the first apparatus to be communicated with the second apparatus; means for determining, based on the assistance data and the measurements from the fourth apparatus, a target beam from a plurality of candidate beams of the first apparatus; and means for performing beam management and/or communications with the second apparatus by using the target beam.

In a sixth aspect of the present disclosure, there is provided a third apparatus. The third apparatus comprises means for obtaining beam capability information of a first apparatus and a second apparatus; means for determining, based at least on the beam capability information, a fourth apparatus as a reference point for a communication between the first apparatus and the second apparatus; and means for transmitting, to the first apparatus and the second apparatus, assistance data for beam alignment between the first apparatus and the second apparatus based on measurements from the fourth apparatus.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
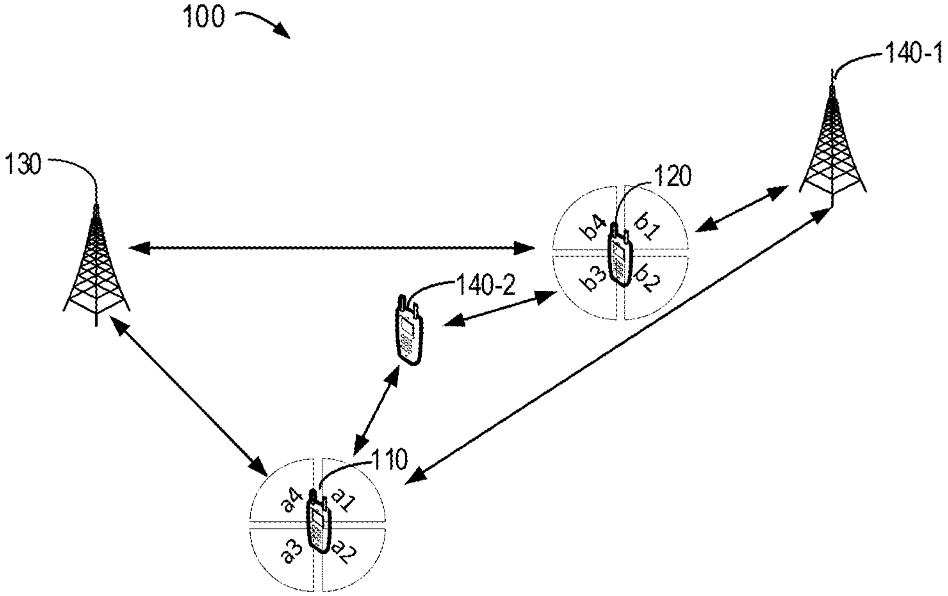
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

According to the example embodiments of the present disclosure, there is provided a solution for SL beam management. In the solution, SL UEs in FR2 are provided with assistance data for beam pairing or recovery purpose. The assistance data may indicate efficient beam pairing or recovery options, e.g., beam search sector or simply concrete beams. With the assistance data, the SL UEs, which may be stable or rotate in an unknown fashion in 3D space, can accurately determine relative orientation based on simple measurements from one or more reference points. As a result, the beam pairing, beam maintenance, and beam failure recovery in SL FR2 can be improved.

Example embodiments of the present disclosure will be described in detail below with reference to the accompanying drawings.

FIG. 1 illustrates an example communication environment 100 in which example embodiments of the present disclosure can be implemented. The communication environment 100 may support SL communications among terminal devices. As shown in FIG. 1, the communication environment 100 may comprise a first apparatus 110, a second apparatus 120, a third apparatus 130 and fourth apparatuses 140-1 and 140-2 (collectively referred to as fourth apparatus 140), which may communicate with each other.

The first apparatus 110 and the second apparatus 120 may be terminal devices, such as, UE. Both of the first apparatus 110 and the second apparatus 120 may support beam-based operations, and thus be able to use a plurality of beams for SL communications. The first apparatus 110 and the second apparatus 120 each may have corresponding beam capabilities. In the example of FIG. 1, the first apparatus 110 is configured with beams a1 to a4, and the second apparatus 120 is configured with beams b1 to b4. In some example embodiments, the beam capabilities may include, but not limited to, spatial coverage, beam width, spatial orientation, and so on.

In some cases, at least one of the first apparatus 110 and the second apparatus 120 may not be stable, for example, due to mobility event or rotation in the 3D space. As a result, the beam orientation may change accordingly.

The third apparatus 130 may be a node that is capable of providing assistance data for beam alignment between the first apparatus 110 and the second apparatus 120. In the example of FIG. 1, the third apparatus 130 is shown as a network device that may be a serving gNB of the first apparatus 110 and the second apparatus 120 in scenario of SL Mode 1. In some other embodiments, the third apparatus 130 may be a nearby UE in scenario of SL Mode 2. In the latter case, the third apparatus 130 may be a third-party UE or one of the first apparatus 110 and the second apparatus 120.

In some example embodiments, a configuration of the assistance data may be conditional. The assistance data may be provided in response to a request from the first apparatus 110 and/or the second apparatus 120. For example, the first apparatus 110 may require assistance for beam alignment with a specific UE, i.e., the second apparatus 120, and thus transmit a request to the third apparatus 130 with an indication.

In some example embodiments, the indication may be explicit. For example, the first apparatus 110 may indicate a need of beam establishment with the second apparatus 120 via a MAC CE or similar container.

Alternatively, in some other example embodiments, the indication may be implicit. For example, the first apparatus 110, when operating in Mode 1, may indicate which peer UEs it will communicate with. This in turn triggers the third apparatus 130 to initiate a beam assistance procedure, which may involve determining a reference point for beam management assistance, providing assistance data for beam alignment, and so on.

In some example embodiments, the start of the beam assistance procedure may be expected to only occur if the third apparatus 130 is aware that both the first apparatus 110 and the second apparatus 120 support beam-based operations.

In some example embodiments, the assistance data may indicate beam pairing or recovery options, such as, beam search sector or simply concrete beam. In particular, this may be used as a function of (or conditioned by) mutual orientation knowledge, e.g., measurements from a reference point, which will be discussed in detail later.

In the example embodiments, the fourth device 140 may serve as a reference point for beam alignment between the first apparatus 110 and the second apparatus 120. The reference point may be a third-party gNB (e.g., the fourth device 140-1) or UE (e.g., the fourth device 140-2). In some example embodiments, multiple reference points are also possible, thus the present disclosure is not limited in this regard. For example, the fourth device 140 may be determined by the third apparatus 130 based on SL UE data, such as, timing advance, Reference Signal Receiving Power (RSRP) for ranging, Angle of Arrival (AoA) for angular localization, and the like. In some cases, a static or immobile reference point with respect to the SL USs may be preferable.

Depending on relative positions of SL UEs and the reference point, and beam capability, beams are varying from the transmitting and receiving performances. The first apparatus 110 and the second apparatus 120 each may measure reference signals from the fourth device 140, and select one from their beams that is suitable for receiving from the fourth device 140 based on the measurement result. With the assistance data, the first apparatus 110 and the second apparatus 120 may then derive respective beams for SL communication with each other.

In the following, for the purpose of illustration, some example embodiments are described with the first apparatus 110, the second apparatus 120 and the fourth apparatus 140-2 operating as terminal devices and the third apparatus 130 and the fourth apparatus 140-1 operating as a network device. However, in some example embodiments, operations described in connection with a terminal device may be implemented at a network device or other device, and operations described in connection with a network device may be implemented at a terminal device or other device.

In some example embodiments, if the first apparatus 110 is a terminal device and the third device 130 is a network device, a link from the third apparatus 130 to the first apparatus 110 is referred to as a downlink (DL), and a link from the first apparatus 110 to the third apparatus 130 is referred to as an uplink (UL). In DL, the third apparatus 130 is a transmitting (TX) device (or a transmitter) and the first apparatus 110 is a receiving (RX) device (or a receiver). In UL, the first apparatus 110 is a TX device (or a transmitter) and the third apparatus 130 is a RX device (or a receiver).

It is to be understood that the number of apparatuses and their connections shown in FIG. 1 are only for the purpose of illustration without suggesting any limitation. The communication network 100 may include any suitable number of apparatuses configured to implementing example embodiments of the present disclosure. Although not shown, it would be appreciated that one or more additional apparatuses and connections may be deployed in the communication network 100.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
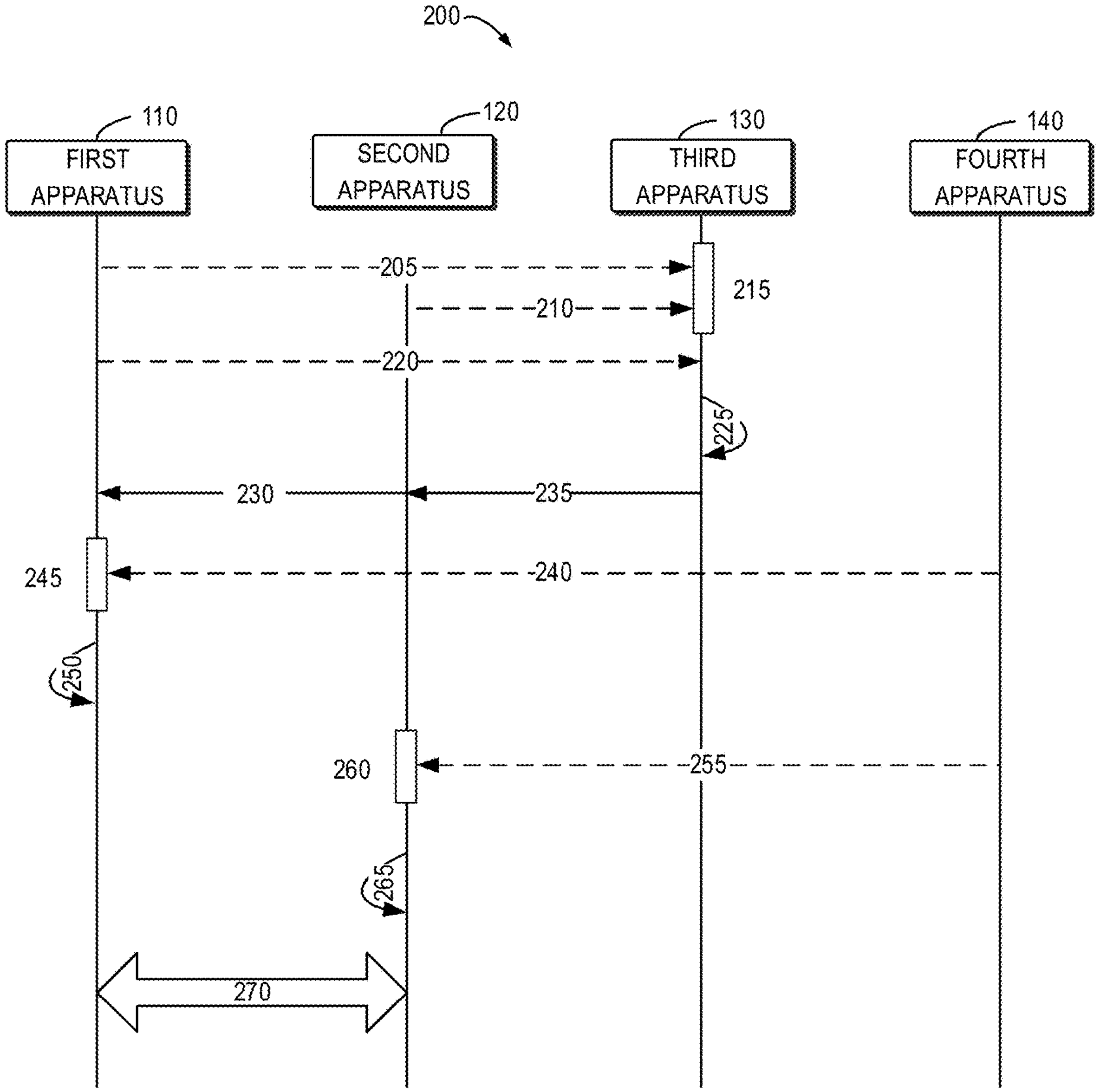
FIG. 2 illustrates a signaling chart for SL beam management process according to some example embodiments of the present disclosure.

Reference is now made to FIG. 2, which illustrates a signaling chart for SL beam management process 200 according to some example embodiments of the present disclosure. As shown in FIG. 2, the SL beam management process 200 involves the first apparatus 110, the second apparatus 120, the third apparatus 130 and the fourth apparatus 140. For the purpose of discussion, reference is made to FIG. 1 to describe the process 200.

The first apparatus 110 and the second apparatus 120 may transmit (205, 210) their respective beam capability information to the third apparatus 130. In some example embodiments, the beam capability information may indicate at least one of a spatial coverage, a spatial orientation, or a beam width of a corresponding one of the first apparatus 110 and the second apparatus 120.

Accordingly, the third apparatus 130 obtains (215) the beam capability information of the first apparatus 110 and the second apparatus 120, and determine the fourth apparatus 140 as a reference point for beam management assistance between the first apparatus 110 and the second apparatus 120.

In some example embodiments, the third apparatus 130 may further receive (220) additional data from the first apparatus 110 and the second apparatus 120, which may be used for determining the reference point. The additional data may include, but not limited to, timing advance, RSRP for ranging, AoA for angular localization, and so on. Accordingly, the third apparatus 130 may determine the fourth device 140 based on the additional data.

In some example embodiments, the reference point may be chosen to lie in a line formed by the first apparatus 110 and the second apparatus 120 that the third apparatus 130 determines based on radio resource management (RRM) measurements reported by the involved SL FR2 UEs, effectively emulating coarse localization (e.g., timing advance for range and angle of arrival for angular orientation with respect to the third apparatus 130). Additionally, a static or immobile reference point with respect to the SL USs may be preferable.

The third apparatus 130 determines (225) assistance data for beam alignment between the first apparatus 110 and the second apparatus 120. In particular, the assistance data for beam alignment may provide beam selection or search options that are indicated as function of measurements from the reference point measurements.

In some example embodiments, the assistance data is provided based on a request from at least one involved SL UE. The request may be carried via a MAC CE or similar container. In this case, the third apparatus 130 may receive a request from at least one of the first apparatus 110 and second apparatus 120 for the assistance data for beam alignment.

The request may comprise a first indication of beam establishment with a specific SL UE. In other words, the first indication may be an explicit indication. For example, the first apparatus 110 may indicate the need for beam establishment with the second apparatus 120.

Additionally, or alternatively, the request may comprise a second indication of a specific SL UE acting as a peer device to communicate with. For example, the first apparatus 110 operating in Mode 1 may indicate that the second apparatus 120 is the peer UE to be communicated with. This may in turn trigger the third apparatus 130 to initiate a beam assistance procedure.

The assistance data may then be distributed on the involved SL UEs. As shown in FIG. 2, the third apparatus 130 transmits (230, 235) the assistance data for beam alignment to the first apparatus 110 and the second apparatus 120.

In some example embodiments, the assistance data may indicate a relationship between the target beam and a reference beam for receiving a reference signal from the reference point. For example, the relationship may be one of the following:

the target beam being in the same direction as the reference beam, the target beam being in an opposite direction as the reference beam, or an angle between the target beam and the reference beam.

The assistance data may instruct one of the involved SL UEs to communicate with the other one by using a specific beam that has a certain relationship with the reference beam for receiving a reference signal from the reference point. By way of example, given the capability knowledge of the second apparatus 120, the third apparatus 130 may issue concrete beam pairing instruction depending on which beam of the second apparatus 120 is the strongest for the reception from the fourth apparatus 140. Similarly, the first apparatus 110 is given assistance data that instructs it to use the same beam that is the best for receiving from the fourth apparatus 140.

The instruction provided by the assistance data may have various forms, which will be discussed in connection with FIGS. 3A to 3D. FIGS. 3A to 3D illustrate schematic diagrams of SL beam management assistance according to some example embodiments of the present disclosure.

Figure 3A:
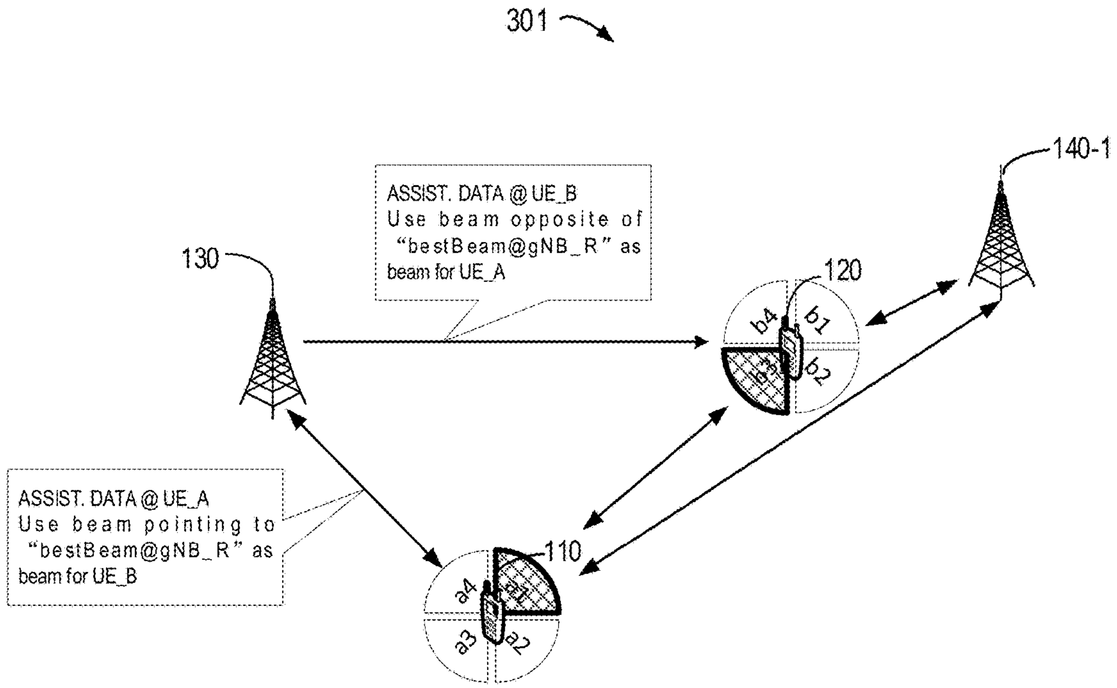
FIGS. 3A to 3D illustrate schematic diagrams of SL beam management assistance according to some example embodiments of the present disclosure.

In the example 301 as shown in FIG. 3A, the fourth apparatus 140-1 is determined as the reference point, denoted by "gNB_R" and the third apparatus 130 provides assistance data to the first apparatus 110 (denoted by UE_A) and the second apparatus 120 (denoted by UE_B), respectively.

In particular, the assistance data sent to the first apparatus 110 indicates "use beam pointing to the best beam for gNB_R as beam for UE_B". The first apparatus 110 may determine beam a1 that points to the fourth apparatus 140-1 as a suitable beam for receiving from the fourth apparatus 140-1. With the assistance data, the first apparatus 110 may then derive beam a1 as the target beam for communications with the second apparatus 120.

The assistance data sent to the second apparatus 120 indicates "use beam opposite to the best beam for gNB_R as beam for UE_A". The second apparatus 120 may determine beam b1 that points to the fourth apparatus 140-1 as a suitable beam for receiving from the fourth apparatus 140-1. With the assistance data, the second apparatus 120 may then derive beam b3 that is opposite to beam b1 as the target beam for communications with the first apparatus 110.

Figure 3B:
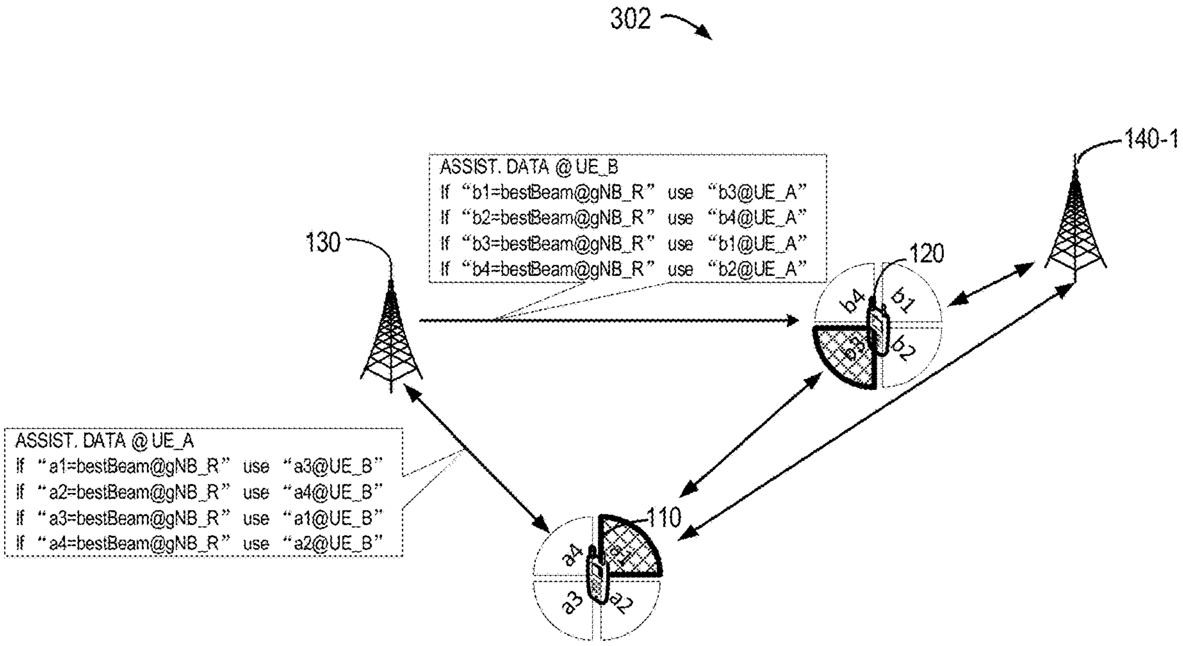

In the example 302 as shown in FIG. 3B, the fourth apparatus 140-1 is determined as the reference point, denoted by "gNB_R" and the third apparatus 130 provides assistance data to the first apparatus 110 (denoted by UE_A) and the second apparatus 120 (denoted by UE_B), respectively.

In particular, the assistance data sent to the first apparatus 110 indicates a mapping of the target beam and the reference beam, e.g., "if beam a1 is the best beam for gNB_R, then use beam a3 for UE_B, if beam a2 is the best beam for gNB_R, then use beam a4 for UE_B, if beam a3 is the best beam for gNB_R, then use beam a1 for UE_B, if beam a4 is the best beam for gNB_R, then use beam a2 for UE_B". The first apparatus 110 may determine beam a1 as a suitable beam for receiving from the fourth apparatus 140-1. With the assistance data, the first apparatus 110 may then derive beam a1 as the target beam for communications with the second apparatus 120.

The assistance data sent to the second apparatus 120 also indicates a mapping of the target beam and the reference beam, e.g., "if beam b1 is the best beam for gNB_R, then use beam b3 for UE_A, if beam b2 is the best beam for gNB_R, then use beam b4 for UE_A, if beam b3 is the best beam for gNB_R, then use beam b1 for UE_A, if beam b4 is the best beam for gNB_R, then use beam b2 for UE_A". The second apparatus 120 may determine beam b1 that points to the fourth apparatus 140-1 as a suitable beam for receiving from the fourth apparatus 140-1. With the assistance data, the second apparatus 120 may then derive beam b3 as the target beam for communications with the second apparatus 120.

Figure 3C:
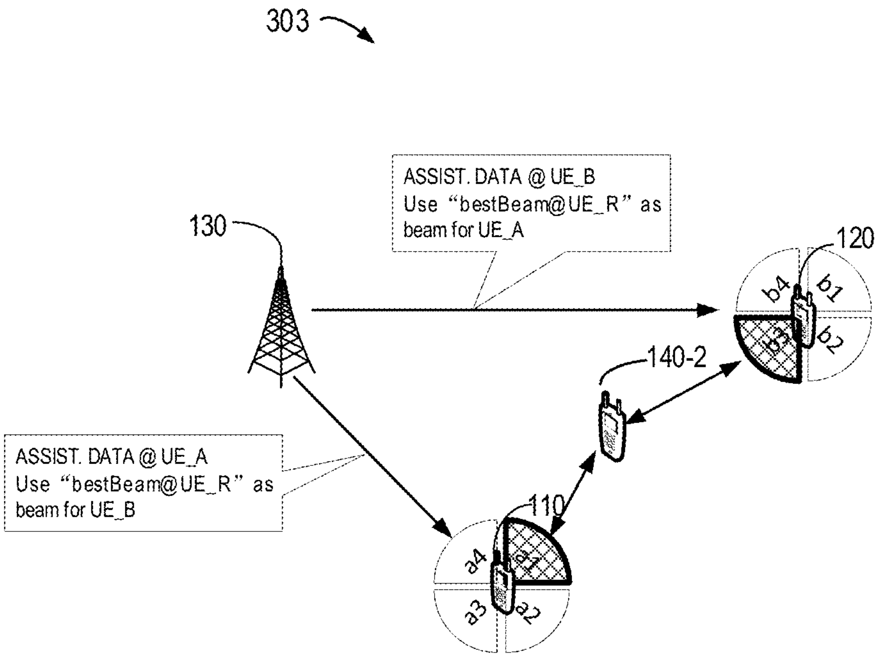

In the example 303 as shown in FIG. 3C, the fourth apparatus 140-2 is determined as the reference point, denoted by "UE_R" and the third apparatus 130 provides assistance data to the first apparatus 110 (denoted by UE_A) and the second apparatus 120 (denoted by UE_B), respectively.

In particular, the assistance data sent to the first apparatus 110 indicates "use best beam for UE_R as beam for UE_B". The first apparatus 110 may determine beam a1 as a suitable beam for receiving from the fourth apparatus 140-2 (e.g., Scheme A discovery message or channel state information reference signal (CSI-RS)) is determined to be the best). With the assistance data, the first apparatus 110 may then derive beam a1 as the target beam for communications with the second apparatus 120.

The assistance data sent to the second apparatus 120 indicates "use best beam for UE_R as beam for UE_A". The second apparatus 120 may determine beam b3 as a suitable beam for receiving from the fourth apparatus 140-2. With the assistance data, the second apparatus 120 may then derive beam b3 as the target beam for communications with the first apparatus 110.

The first apparatus 110 may receive (240) and measure (245) reference signal from the fourth apparatus 140. Accordingly, the first apparatus 110 determines (250), based on the assistance data and the measurements from the fourth apparatus 140, a target beam from a plurality of candidate beams a1 to a4 of the first apparatus 110.

In an analogous manner, the second apparatus 120 may receive (255) and measure (260) reference signal from the fourth apparatus 140. Accordingly, the second apparatus 120 determines (265), based on the assistance data and the measurements from the fourth apparatus 140, a target beam from a plurality of candidate beams b1 to b4 of the second apparatus 120.

The first apparatus 110 and the second apparatus 120 may then perform (270) beam management and/or communications with each other by using the corresponding target beams. The beam management and/or communications may include, but not limited to beam pairing, beam maintenance, beam failure recovery and so on.

In some cases, the SL UEs may not be spatially stable, for example, due to mobility event or rotations in 3D space. Such a SL UE may be at least a part of a car, or a handset that can rotate freely in 3D space. As a result, the beam orientation may be changed. If one of the SL UEs rotates, the SL UE may dynamically evaluate the beam based on the reference measurements.

In some example embodiments, the first apparatus 110 may determine that at least one of the first apparatus 110 and the second apparatus 120 changes beam orientation. In this case, the first apparatus 110 may determine an updated target beam from the plurality of candidate beams based on the measurements from the fourth apparatus 140.

Figure 3D:
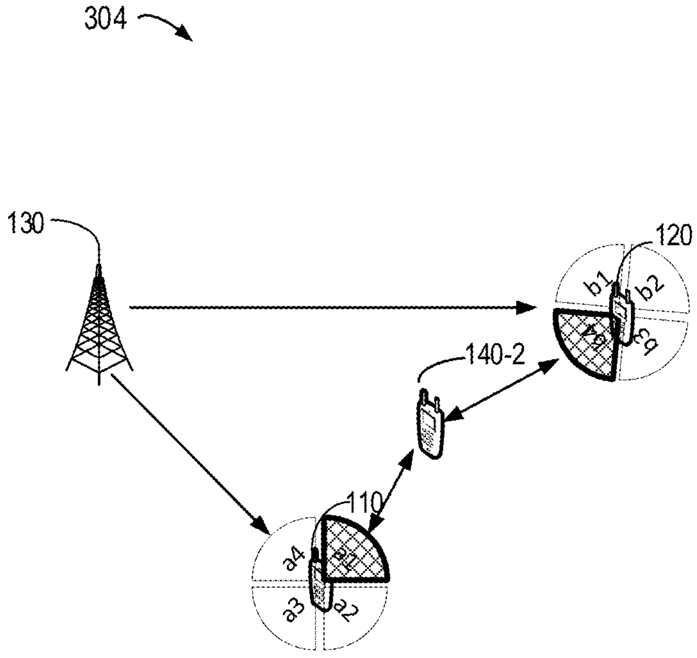

By way of example, after configured with assistance data in FIG. 3C, and beam pairing between the first apparatus 110 and the second apparatus 120 succeeds, the second apparatus 120 may change beam orientation, as shown in FIG. 3D. In this case, the second apparatus 120 may evaluate the beams based on the measurements from the fourth apparatus 140, and determine that beam b4 as the updated target beam for communicating with the first apparatus 110.

In some example embodiments, once beam pairing between both SL UEs succeeds, the received assistance data may no longer be used, and a normal beam maintenance procedure would be followed. However, assistance data may be automatically used during beam failure recovery. To this end, the serving gNB may periodically update the assistance data, for example, whenever there is a mobility event or after a predetermined time interval (e.g., after some minimal update time elapses).

For example, the first apparatus 110 may receive updated assistance data for beam alignment with the second apparatus 120 from the third apparatus 130. Accordingly, the first apparatus 110 may perform beam failure recovery based on the updated assistance data.

By means of the assistance data, the beam management in SL FR2 can be improved, which can be applied to many use cases, including public safety, V2 X, industrial IoT, and so on.

Figure 4:
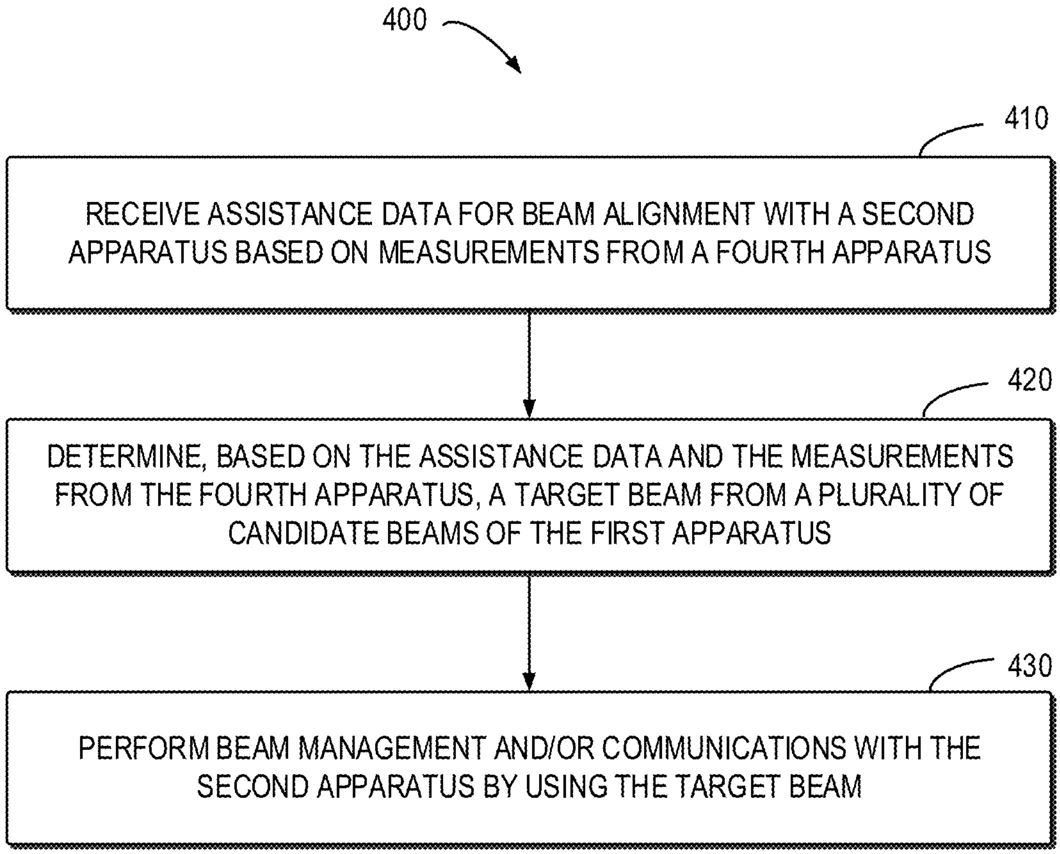
FIG. 4 illustrates a flowchart of a method implemented at an apparatus according to some example embodiments of the present disclosure.

FIG. 4 illustrates a flowchart of an example method 400 implemented at an apparatus in accordance with some example embodiments of the present disclosure. The apparatus may be, for example, a termina device (e.g., UE). For the purpose of discussion, the method 400 will be described from the perspective of the first apparatus 110 in FIG. 1.

At block 410, the first apparatus 110 receives, from a third apparatus, assistance data for beam alignment with a second apparatus based on measurements from a fourth apparatus. The first apparatus is to be communicated with the second apparatus.

At block 420, the first apparatus 110 determines, based on the assistance data and the measurements from the fourth apparatus, a target beam from a plurality of candidate beams of the first apparatus.

At block 430, the first apparatus 110 performs beam management and/or communications with the second apparatus by using the target beam.

In some example embodiments, the method 400 may further comprise: transmitting, to the third apparatus, beam capability information of the first apparatus and the second apparatus, wherein the beam capability information indicates at least one of a spatial coverage, a spatial orientation, or a beam width of a corresponding one of the first apparatus and the second apparatus, and wherein the assistance information for beam alignment is determined based on the beam capability information.

In some example embodiments, the method 400 may further comprise: transmitting, to the third apparatus, a request for the assistance data for beam alignment, wherein the request comprises one of the following: a first indication of beam establishment with the second apparatus, or a second indication of the second apparatus acting as a peer device to communicate with the first apparatus.

In some example embodiments, determining the target beam may comprise: measuring, with each of the plurality of candidate beams, at least one reference signal from the fourth apparatus; determining, based on the measurement result, a reference beam for communicating with the fourth apparatus from the plurality of candidate beams; and determining, based on the assistance information and the reference beam, the target beam for communicating with the second apparatus.

In some example embodiments, the fourth apparatus may be determined based on a radio resource management report from at least one of the first apparatus and the second apparatus.

In some example embodiments, the assistance data may indicate a relationship between the target beam and a reference beam for receiving a reference signal from the fourth apparatus.

In some example embodiments, the relationship comprises one of the following: the target beam being in the same direction as the reference beam, the target beam being in an opposite direction as the reference beam, or an angle between the target beam and the reference beam.

In some example embodiments, the beam management and/or communications may comprise at least one of the following: a beam pairing, a beam maintenance, or a beam failure recovery.

In some example embodiments, the method 400 may further comprise: determining that at least one of the first apparatus and the second apparatus changes beam orientation; and determining, based on the measurements from the fourth apparatus, an updated target beam from the plurality of candidate beams.

In some example embodiments, the method 400 may further comprise: receiving, from the third apparatus, updated assistance data for beam alignment with the second apparatus; and performing beam failure recovery based on the updated assistance data.

In some example embodiments, the first apparatus may comprise a first terminal device, the second apparatus may comprise a second terminal device, and the second apparatus is the same as or different from the third apparatus.

In some example embodiments, the third apparatus may comprise one of a first network device serving the first and second apparatuses, or a third terminal device in proximity to the first and second apparatuses, and the fourth apparatus may comprise one of a second network device or a fourth terminal device.

Figure 5:
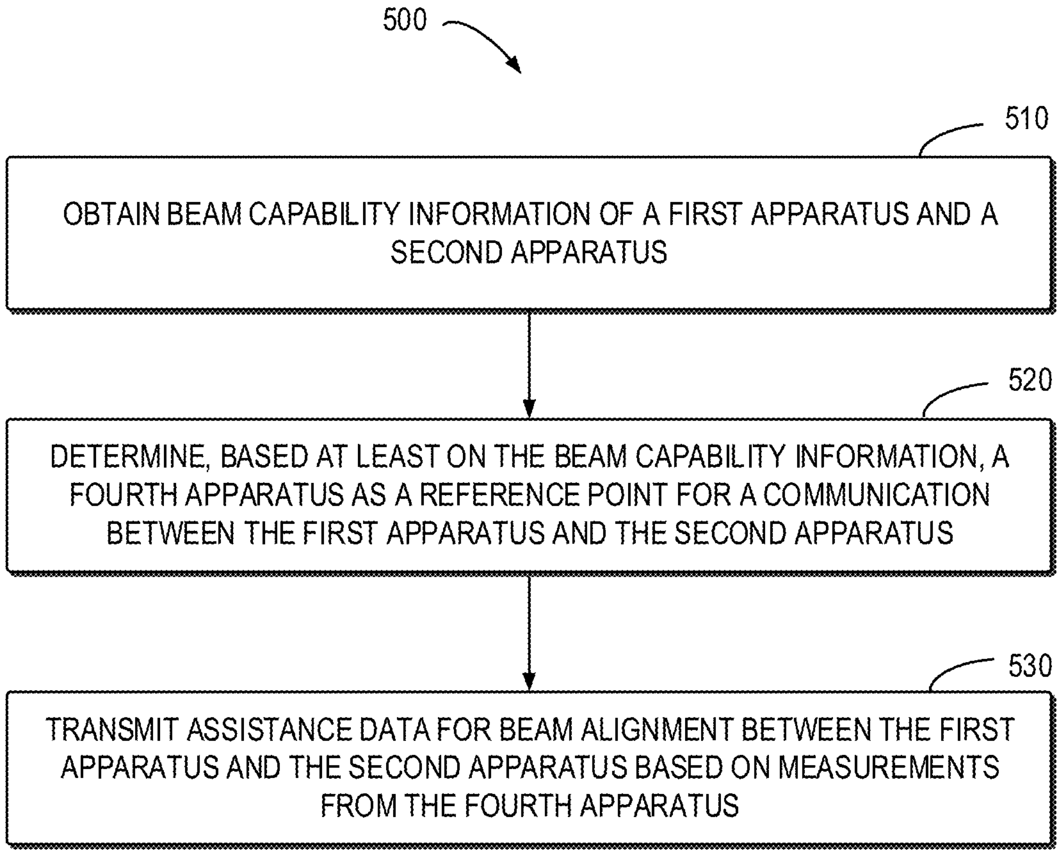
FIG. 5 illustrates a flowchart of a method implemented at an apparatus according to some example embodiments of the present disclosure.

FIG. 5 illustrates a flowchart of an example method 500 implemented at an apparatus in accordance with some example embodiments of the present disclosure. The apparatus may be a terminal device (e.g., UE) or a network device (e.g., gNB). For the purpose of discussion, the method 500 will be described from the perspective of the third apparatus 130 in FIG. 1.

At block 510, the third apparatus 130 obtains beam capability information of a first apparatus and a second apparatus.

At block 520, the third apparatus 130 determines, based at least on the beam capability information, a fourth apparatus as a reference point for a communication between the first apparatus and the second apparatus.

At block 530, the third apparatus 130 transmits, to the first apparatus and the second apparatus, assistance data for beam alignment between the first apparatus and the second apparatus based on measurements from the fourth apparatus.

In some example embodiments, the method 500 may further comprise: receiving the beam capability information from the first apparatus and the second apparatus, wherein the beam capability information indicates at least one of a spatial coverage, a spatial orientation, or a beam width of a corresponding one of the first apparatus and the second apparatus.

In some example embodiments, the method 500 may further comprise: receiving, from one of the first apparatus and the second apparatus, a request for the assistance data for beam alignment, wherein the request comprises one of the following: a first indication of beam establishment with the other one of the first apparatus and the second apparatus, or a second indication of the other one of the first apparatus and the second apparatus acting as a peer device to communicate with.

In some example embodiments, the fourth apparatus may be determined further based on a radio resource management report from at least one of the first apparatus and the second apparatus.

In some example embodiments, the assistance data may indicate a relationship between the target beam and a reference beam for receiving a reference signal from the fourth apparatus.

In some example embodiments, the relationship comprises one of the following: the target beam being in the same direction as the reference beam, the target beam being in an opposite direction as the reference beam, or an angle between the target beam and the reference beam.

In some example embodiments, the method 500 may further comprise: transmit, to the first apparatus and the second apparatus, an updated assistance data for beam alignment, wherein the assistance data for beam alignment is updated periodically, based on a mobility event, or after a predetermined time interval.

In some example embodiments, the first apparatus may comprise a first terminal device, the second apparatus may comprise a second terminal device, and the second apparatus is the same as or different from the third apparatus.

In some example embodiments, the third apparatus may comprise one of a first network device serving the first and second apparatuses, or a third terminal device in proximity to the first and second apparatuses, and the fourth apparatus may comprise one of a second network device or a fourth terminal device.

Example Apparatus, Device and Medium

In some example embodiments, a first apparatus capable of performing any of the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises: means for receiving, from a third apparatus, assistance data for beam alignment with a second apparatus based on measurements from a fourth apparatus, the first apparatus to be communicated with the second apparatus; means for determining, based on the assistance data and the measurements from the fourth apparatus, a target beam from a plurality of candidate beams of the first apparatus; and means for performing beam management and/or communications with the second apparatus by using the target beam.

In some example embodiments, the first apparatus further comprises: means for transmitting, to the third apparatus, beam capability information of the first apparatus and the second apparatus, wherein the beam capability information indicates at least one of a spatial coverage, a spatial orientation, or a beam width of a corresponding one of the first apparatus and the second apparatus, and wherein the assistance information for beam alignment is determined based on the beam capability information.

In some example embodiments, the first apparatus further comprises: means for transmitting, to the third apparatus, a request for the assistance data for beam alignment, wherein the request comprises one of the following: a first indication of beam establishment with the second apparatus, or a second indication of the second apparatus acting as a peer device to communicate with the first apparatus.

In some example embodiments, the means for determining the target beam comprises: means for measuring, with each of the plurality of candidate beams, at least one reference signal from the fourth apparatus; means for determining, based on the measurement result, a reference beam for communicating with the fourth apparatus from the plurality of candidate beams; and means for determining, based on the assistance information and the reference beam, the target beam for communicating with the second apparatus.

In some example embodiments, the fourth apparatus is determined based on a radio resource management report from at least one of the first apparatus and the second apparatus.

In some example embodiments, the assistance data indicates a relationship between the target beam and a reference beam for receiving a reference signal from the fourth apparatus.

In some example embodiments, the relationship comprises one of the following: the target beam being in the same direction as the reference beam, the target beam being in an opposite direction as the reference beam, or an angle between the target beam and the reference beam.

In some example embodiments, the beam management and/or communications comprises at least one of the following: a beam pairing, a beam maintenance, or a beam failure recovery.

In some example embodiments, the first apparatus further comprises means for determining that at least one of the first apparatus and the second apparatus changes beam orientation; and means for determining, based on the measurements from the fourth apparatus, an updated target beam from the plurality of candidate beams.

In some example embodiments, the first apparatus further comprises means for receiving, from the third apparatus, updated assistance data for beam alignment with the second apparatus; and means for performing beam failure recovery based on the updated assistance data.

In some example embodiments, the first apparatus comprises a first terminal device, the second apparatus comprises a second terminal device, and the second apparatus is the same as or different from the third apparatus.

In some example embodiments, the third apparatus comprises one of a first network device serving the first and second apparatuses, or a third terminal device in proximity to the first and second apparatuses, and the fourth apparatus comprises one of a second network device or a fourth terminal device.

In some example embodiments, the first apparatus further comprises means for performing other operations in some example embodiments of the method 400 or the first apparatus 110. In some example embodiments, the means comprises at least one processor; and at least one memory storing instructions that, when executed by the at least one processor, cause the performance of the first apparatus.

In some example embodiments, a third apparatus capable of performing any of the method 500 (for example, the third apparatus 130 in FIG. 1) may comprise means for performing the respective operations of the method 500. The means may be implemented in any suitable form. For example, the means may be implemented in a circuitry or software module. The third apparatus may be implemented as or included in the third apparatus 130 in FIG. 1.

In some example embodiments, the third apparatus comprises means for obtaining beam capability information of a first apparatus and a second apparatus; means for determining, based at least on the beam capability information, a fourth apparatus as a reference point for a communication between the first apparatus and the second apparatus; and means for transmitting, to the first apparatus and the second apparatus, assistance data for beam alignment between the first apparatus and the second apparatus based on measurements from the fourth apparatus.

In some example embodiments, the third apparatus further comprises: means for receiving the beam capability information from the first apparatus and the second apparatus, wherein the beam capability information indicates at least one of a spatial coverage, a spatial orientation, or a beam width of a corresponding one of the first apparatus and the second apparatus.

In some example embodiments, the third apparatus further comprises: means for receiving, from one of the first apparatus and the second apparatus, a request for the assistance data for beam alignment, wherein the request comprises one of the following: a first indication of beam establishment with the other one of the first apparatus and the second apparatus, or a second indication of the other one of the first apparatus and the second apparatus acting as a peer device to communicate with.

In some example embodiments, the fourth apparatus is determined further based on a radio resource management report from at least one of the first apparatus and the second apparatus.

In some example embodiments, the assistance data indicates a relationship between the target beam and a reference beam for receiving a reference signal from the fourth apparatus.

In some example embodiments, the relationship comprises one of the following: the target beam being in the same direction as the reference beam, the target beam being in an opposite direction as the reference beam, or an angle between the target beam and the reference beam.

In some example embodiments, the third apparatus further comprises: means for transmitting, to the first apparatus and the second apparatus, an updated assistance data for beam alignment, wherein the assistance data for beam alignment is updated periodically, based on a mobility event, or after a predetermined time interval.

In some example embodiments, the first apparatus comprises a first terminal device, the second apparatus comprises a second terminal device, and the second apparatus is the same as or different from the third apparatus.

In some example embodiments, the third apparatus comprises one of a first network device serving the first and second apparatuses, or a third terminal device in proximity to the first and second apparatuses, and the fourth apparatus comprises one of a second network device or a fourth terminal device.

In some example embodiments, the third apparatus further comprises means for performing other operations in some example embodiments of the method 500 or the third apparatus 130. In some example embodiments, the means comprises at least one processor; and at least one memory storing instructions that, when executed by the at least one processor, cause the performance of the third apparatus.

Figure 6:
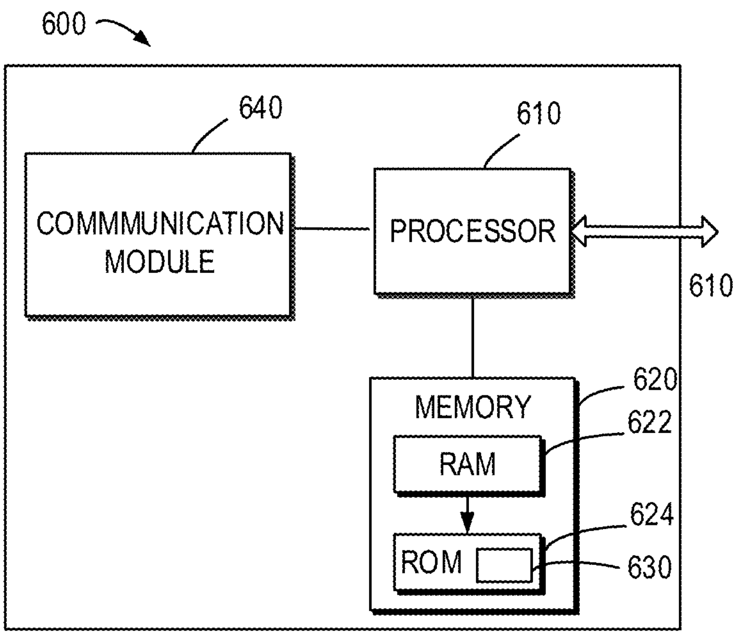
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110, the second apparatus 120, the third apparatus 130, or the fourth apparatus 140 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
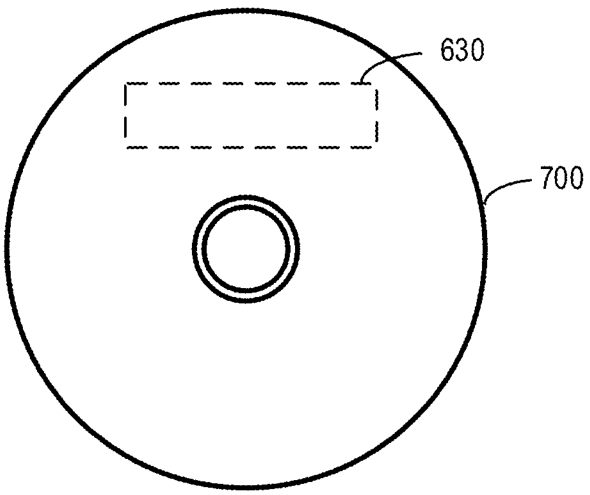
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

transmit, to a third apparatus, information comprising beam capability information, timing advance, Reference Signal Receiving Power (RSRP) for ranging, and Angle of Arrival (AoA) for angular localization of the first apparatus and a second apparatus to be in communication with the first apparatus, wherein the beam capability information indicates a spatial coverage, a spatial orientation, and a beam width of a corresponding one of the first apparatus and the second apparatus;

receive an indication that a fourth apparatus is selected as a reference point between the first apparatus and the second apparatus based on the information;

receive, from the third apparatus, assistance data for beam alignment with the second apparatus based on measurements of a reference signal from a fourth apparatus, wherein the assistance data is determined based on the beam capability information;

measure, with each of a plurality of candidate beams of the first apparatus, at least one reference signal from the fourth apparatus;

determine, based on the measuring, a reference beam for communicating with the fourth apparatus from the plurality of candidate beams; and determine, based on the assistance data, the measurement from the fourth apparatus, and the reference beam, a target beam from the plurality of candidate beams of the first apparatus;

perform beam management and communications with the second apparatus by using the target beam, wherein the beam management and communications comprises:

a beam pairing, a beam maintenance, and a beam failure recovery;

determine that the first apparatus and the second apparatus changed beam orientation; and based on the determination that the first apparatus and the second apparatus changed beam orientation, determine, based on the measurements from the fourth apparatus, an updated target beam from the plurality of candidate beams.

2. The first apparatus of claim 1, wherein the first apparatus is further caused to:

transmit, to the third apparatus, a request for the assistance data for beam alignment, wherein the request comprises a first indication of beam establishment with the second apparatus.

3. The first apparatus of claim 1, wherein the first apparatus is further caused to:

transmit, to the third apparatus, a request for the assistance data for beam alignment, wherein the request comprises a second indication of the second apparatus acting as a peer device to communicate with the first apparatus.

4. The first apparatus of claim 3, wherein the fourth apparatus is determined based further on a radio resource management report from the first apparatus and the second apparatus.

5. The first apparatus of claim 4, wherein the assistance data indicates a relationship between the target beam and the reference beam for receiving the reference signal from the fourth apparatus.

6. The first apparatus of claim 5, wherein the relationship comprises:

an angle between the target beam and the reference beam; and one of the following: the target beam being in a same direction as the reference beam, or the target beam being in an opposite direction as the reference beam.

7. The first apparatus of claim 6, wherein the first apparatus is further caused to:

receive, from the third apparatus, updated assistance data for beam alignment with the second apparatus; and perform beam failure recovery based on the updated assistance data.

8. The first apparatus of claim 7, wherein the first apparatus comprises a first terminal device, the second apparatus comprises a second terminal device, and the second apparatus is the same as or different from the third apparatus.

9. The first apparatus of claim 8, wherein the third apparatus comprises one of a first network device serving the first and second apparatuses, or a third terminal device in proximity to the first and second apparatuses, and the fourth apparatus comprises one of a second network device or a fourth terminal device.

10. A system comprising:

a first apparatus:

at least one processor; and at least one memory storing instructions that, when executed by the at least one processor, cause the first apparatus at least to:

transmit, to a third apparatus, information comprising beam capability information, timing advance, Reference Signal Receiving Power (RSRP) for ranging, and Angle of Arrival (AoA) for angular localization of the first apparatus and a second apparatus to be in communication with the first apparatus, wherein the beam capability information indicates a spatial coverage, a spatial orientation, and a beam width of a corresponding one of the first apparatus and the second apparatus;

receive an indication that a fourth apparatus is selected as a reference point between the first apparatus and the second apparatus based on the information;

receive, from the third apparatus, assistance data for beam alignment with the second apparatus based on measurements of a reference signal from a fourth apparatus, wherein the assistance data is determined based on the beam capability information;

measure, with each of a plurality of candidate beams of the first apparatus, at least one reference signal from the fourth apparatus;

determine, based on the measuring, a reference beam for communicating with the fourth apparatus from the plurality of candidate beams; and determine, based on the assistance data, the measurement from the fourth apparatus, and the reference beam, a target beam from the plurality of candidate beams of the first apparatus;

perform beam management and communications with the second apparatus by using the target beam, wherein the beam management and communications comprises:

a beam pairing, a beam maintenance, and a beam failure recovery;

determine that the first apparatus and the second apparatus changed beam orientation; and based on the determination that the first apparatus and the second apparatus changed beam orientation, determine, based on the measurements from the fourth apparatus, an updated target beam from the plurality of candidate beams.

11. The system of claim 10, wherein the first apparatus is further caused to:

transmit, to the third apparatus, a request for the assistance data for beam alignment, wherein the request comprises a first indication of beam establishment with the second apparatus.

12. The system of claim 11, wherein the first apparatus is further caused to:

transmit, to the third apparatus, a request for the assistance data for beam alignment, wherein the request comprises a second indication of the second apparatus acting as a peer device to communicate with the first apparatus.

13. The system of claim 12, wherein the fourth apparatus is determined based further on a radio resource management report from the first apparatus and the second apparatus.

14. The system of claim 13, wherein the assistance data indicates a relationship between the target beam and the reference beam for receiving the reference signal from the fourth apparatus.

15. The system of claim 14, wherein the relationship comprises:

an angle between the target beam and the reference beam; and one of the following: the target beam being in a same direction as the reference beam, or the target beam being in an opposite direction as the reference beam.

16. The system of claim 15, wherein the first apparatus is further caused to:

receive, from the third apparatus, updated assistance data for beam alignment with the second apparatus; and perform beam failure recovery based on the updated assistance data.

17. The system of claim 16, wherein the first apparatus comprises a first terminal device, the second apparatus comprises a second terminal device, and the second apparatus is the same as or different from the third apparatus.

18. The system of claim 17, wherein the third apparatus comprises one of a first network device serving the first and second apparatuses, or a third terminal device in proximity to the first and second apparatuses, and the fourth apparatus comprises one of a second network device or a fourth terminal device.

19. A method comprising:

transmitting, by a first apparatus to a third apparatus, information comprising beam capability information, timing advance, Reference Signal Receiving Power (RSRP) for ranging, and Angle of Arrival (AoA) for angular localization of the first apparatus and a second apparatus to be in communication with the first apparatus, wherein the beam capability information indicates a spatial coverage, a spatial orientation, and a beam width of a corresponding one of the first apparatus and the second apparatus;

receiving an indication that a fourth apparatus is selected as a reference point between the first apparatus and the second apparatus based on the information;

receiving, from the third apparatus, assistance data for beam alignment with the second apparatus based on measurements of a reference signal from a fourth apparatus, wherein the assistance data is determined based on the beam capability information;

measuring, with each of a plurality of candidate beams of the first apparatus, at least one reference signal from the fourth apparatus;

determining, based on the measuring, a reference beam for communicating with the fourth apparatus from the plurality of candidate beams; and determining, based on the assistance data, the measurement from the fourth apparatus, and the reference beam, a target beam from the plurality of candidate beams of the first apparatus;

performing beam management and communications with the second apparatus by using the target beam, wherein the beam management and communications comprises: a beam pairing, a beam maintenance, and a beam failure recovery;

determining that the first apparatus and the second apparatus changed beam orientation; and based on the determination that the first apparatus and the second apparatus changed beam orientation, determining, based on the measurements from the fourth apparatus, an updated target beam from the plurality of candidate beams.

20. The method according to claim 19, wherein the assistance data indicates a relationship between the target beam and the reference beam for receiving the reference signal from the fourth apparatus, and wherein the relationship comprises:

an angle between the target beam and the reference beam; and one of the following: the target beam being in a same direction as the reference beam, or the target beam being in an opposite direction as the reference beam.

* * * * *